US006934327B1

(12) United States Patent
Whited et al.

(10) Patent No.: US 6,934,327 B1
(45) Date of Patent: Aug. 23, 2005

(54) ACQUISITION OF A CONTINUOUS-PHASE MODULATION WAVEFORM

(75) Inventors: Joseph C. Whited, Marion, IA (US); Steven L. White, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 856 days.

(21) Appl. No.: 09/840,613

(22) Filed: Apr. 23, 2001

(51) Int. Cl.[7] .................. H04B 17/00; H04B 3/46; H04Q 1/20
(52) U.S. Cl. .................................... 375/225
(58) Field of Search ............... 375/225, 327, 375/376, 330

(56) References Cited

U.S. PATENT DOCUMENTS

| | | | | |
|---|---|---|---|---|
| 3,877,013 A | * | 4/1975 | Gouillou | 342/455 |
| 4,862,481 A | * | 8/1989 | Dzung | 375/284 |
| 5,018,114 A | * | 5/1991 | Mackelburg et al. | 367/134 |
| 5,032,002 A | * | 7/1991 | Fonneland et al. | 349/104 |
| 5,155,741 A | * | 10/1992 | Waters et al. | 375/142 |
| 5,425,058 A | * | 6/1995 | Mui | 375/336 |
| 5,638,375 A | * | 6/1997 | Dettro et al. | 370/324 |
| 5,638,406 A | * | 6/1997 | Sogabe | 375/326 |
| 5,867,124 A | * | 2/1999 | Sointula | 342/418 |
| 6,347,120 B1 | * | 2/2002 | Sakoda | 375/259 |
| 6,466,630 B1 | * | 10/2002 | Jensen | 375/327 |
| 6,587,447 B1 | * | 7/2003 | Wang et al. | 370/335 |
| 2002/0071503 A1 | * | 6/2002 | Myers | 375/330 |

* cited by examiner

*Primary Examiner*—Stephen Chin
*Assistant Examiner*—Harry Vartaniaan
(74) *Attorney, Agent, or Firm*—Nathan O. Jensen; Kyle Eppele

(57) ABSTRACT

Acquisition of a waveform such as a continuous-phase modulation (CPM) waveform is described. In one embodiment of the invention, the invention is directed to a method and apparatus for acquiring a waveform as defined by MIL-STD-188-181B including the preamble of such a waveform at a performance level defined by the standard. The present invention provides solutions to at least four primary issues presented in acquiring a CPM waveform such as the MIL-STD-188-181B compliant waveform. These primary problems include searching for the preamble, determination of the symbol rate, determination of an initial carrier frequency error (Doppler), determination of an initial carrier phase, and determination of the start-of-message to establish an absolute time marker within the waveform.

20 Claims, 4 Drawing Sheets

ACQUISITION OF A CONTINUOUS-PHASE MODULATION WAVEFORM

BACKGROUND OF THE INVENTION

The present invention relates generally to the field of communications, and more specifically to radio-frequency data communications.

Acquisition is an important and often difficult task for any modem. This is especially true for waveforms having higher data rates that employ complex modulations such as continuous-phase modulation (CPM). In ultra-high frequency (UHF) satellite communications (SATCOM) military waveform standards, several higher data rate waveforms are defined, for example MIL-STD-188-181B. The majority of these modes rely on CPM for both the waveform preamble and data. In all cases, the preamble uses a type of CPM called minimum-shift keying (MSK). The specification defines the MSK preamble, and further requires that the signal be acquired 95 percent of the time with 90 percent confidence at a bit-error rate of $10^{-3}$.

SUMMARY OF THE INVENTION

The present invention is directed to a method and apparatus for acquiring a continuous-phase modulation (CPM) waveform. In one embodiment of the invention, the invention is directed to a method and apparatus for acquiring a waveform as defined by MIL-STD-188-181B including the preamble of such a waveform at a performance level defined by the standard. The present invention provides solutions to at least four primary problems presented in acquiring an MSK waveform such as the MIL-STD-188-181B compliant waveform preamble. These primary problems include searching for the preamble, determination of the symbol rate, determination of an initial carrier frequency error (Doppler), determination of an initial carrier phase, and determination of the start-of-message to establish an absolute time marker within the waveform. In one embodiment, the invention includes a means for performing a Fourier transform on a sampled waveform, a means for providing a power spectrum of the Fourier transformed waveform, a means for estimating a signal-to-noise ratio based upon the power spectrum, a means for determining whether the signal-to-noise ration is less than a threshold value, a means for accumulating the power spectrum when the signal-to-noise ratio is not less than the threshold value, and a means for estimating a symbol rate of the waveform based upon an accumulated power spectrum. In another embodiment, the invention includes a means for normalizing samples of a sampled waveform, a means for correlating the normalized samples with known start-of-message samples to provide a correlation output, a means for storing a magnitude value of the correlation output, a means for adjusting the magnitude value of the correlation output to reduce an effect of a sync pattern of the waveform on the magnitude value of the correlation output, a means for determining whether the adjusted magnitude value of the correlation output exceeds a threshold value, and a means for detecting a correlation peak wherein the start-of-message of the waveform is determined.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to one or more embodiments of the invention, an example of which is illustrated in the accompanying drawings.

Figure 1:
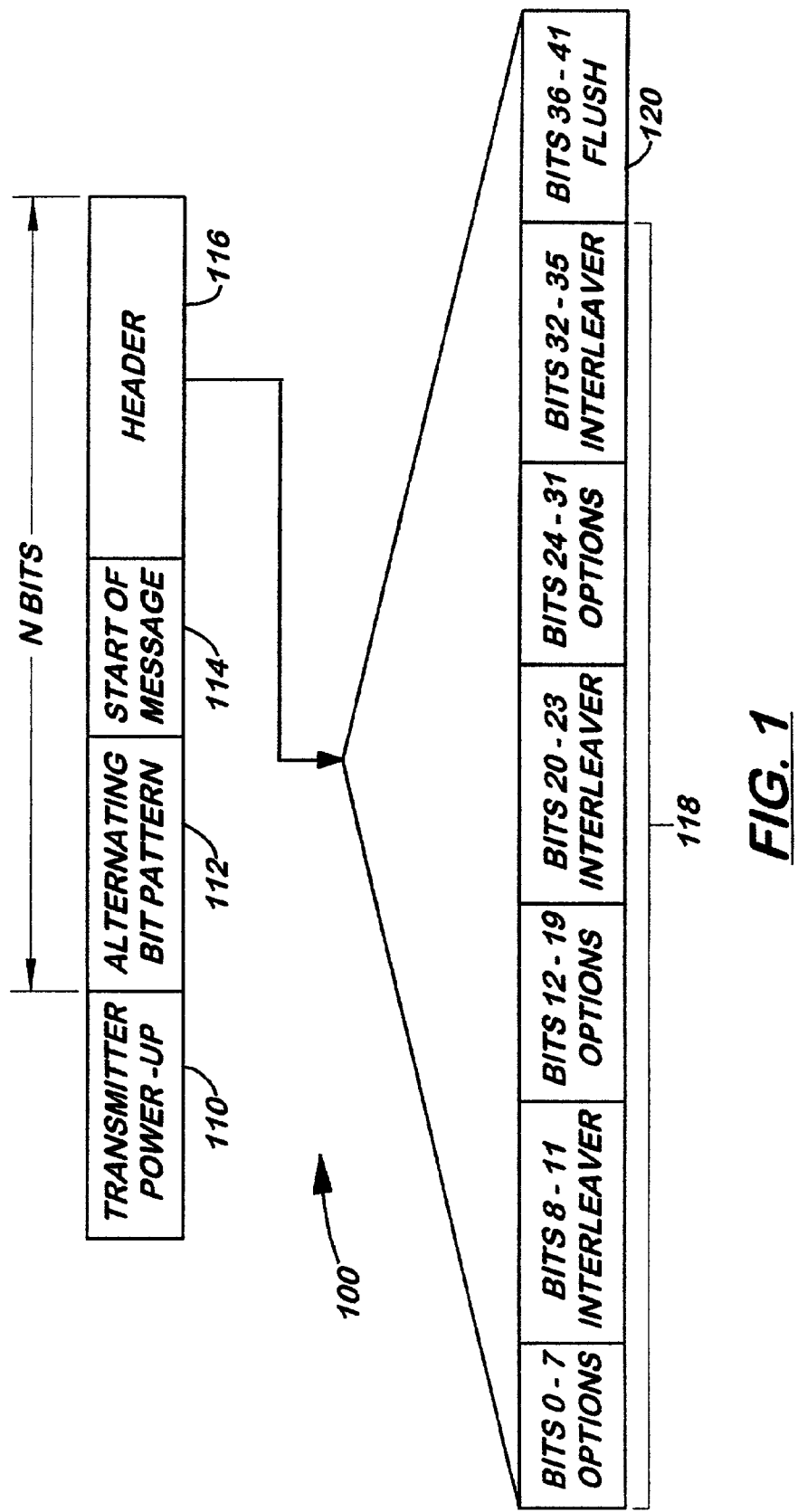
FIG. 1 is a diagram of the structure of a preamble of a minimum-shift keying continuous-phase modulation waveform capable of being acquired in accordance with the present invention.

Referring now to FIG. 1, a preamble of a continuous-phase modulation (CPM) waveform in accordance with the present invention will be discussed. Preamble 100 is part of a higher data rate waveform such as a waveform compliant with the MIL-STD-188-181B continuous-phase modulation (CPM) waveform. Although FIG. 1 shows a preamble for a particular CPM waveform, the present invention may be adapted to other CPM waveforms or the like without departing from the scope of the invention and without providing substantial change thereto. Preamble 100 is identical to the MIL-STD-188-181B preamble. Preamble 100 begins, after a transmitter power-up section 110, with an alternating bit pattern 112, in one embodiment comprising 192 sync bits (e.g., a repeated pattern 11001100 . . . ) to be used for preamble and symbol rate detection. After alternating bit pattern 112 is a 16-bit start-of-message (SOM) 114 bit pattern, in one embodiment AC3B hexadecimal, to provide symbol timing and absolute time marking. Following the SOM 114 is header 116. In the embodiment shown, header 116 comprises a 12-bit header divided into sub blocks 118, repeated 3 times for a total of 36 bits, containing waveform information. The tail of preamble 100 consists of 6 flush bits 120 (010101 or 110101) intended to force 0 phase after preamble 100.

Figure 2:
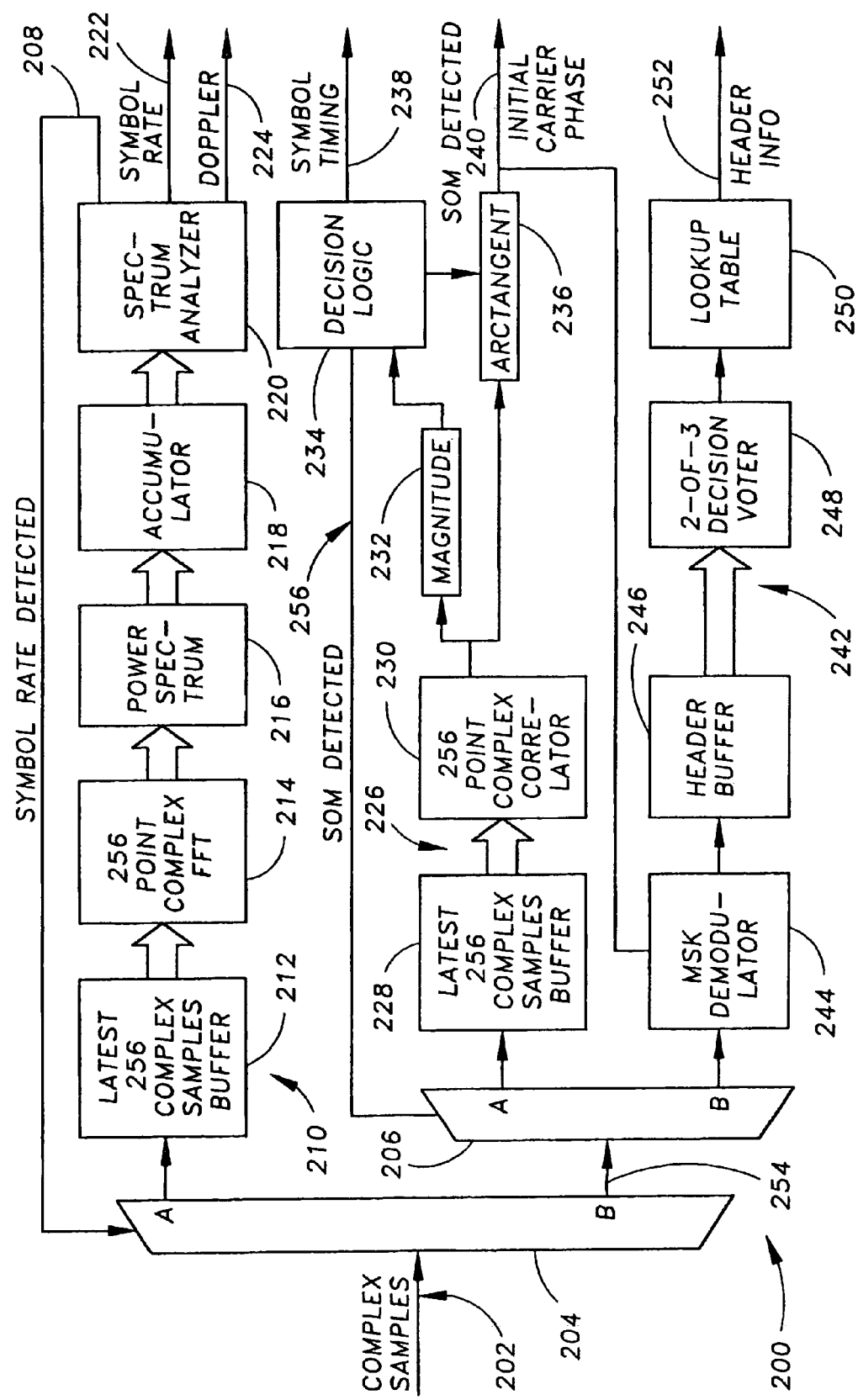
FIG. 2 is a diagram of an acquisition system that is capable of implementing a method for acquiring a continuous-phase modulation waveform in accordance with the present invention.

Referring now to FIG. 2, a block diagram of an acquisition system in accordance with the present invention is shown. The acquisition system 200 shown in FIG. 2 is the architecture for a radio-frequency (RF) modem capable of acquiring a CPM waveform. All of the elements of acquisition system 200 may be tangibly embodied as structure that implements the corresponding elements, where the structure includes an appropriate circuit, e.g., filter, amplifier, oscillator, etc., or other hardware structure. In one particular embodiment, the elements of acquisition system 200 are implemented in a digital processing system that is configured to implement the elements of acquisition system 200. In such an embodiment, digital processing system may include a digital signal processor and associated hardware that is configured via software instructions to implement the elements of acquisition system 200, and may also include hardware logic circuits, such as a logic gates, multiplexers, latches, registers, etc., configured to perform the functions of the elements of acquisition system 200. Acquisition system 200 acquires a CPM waveform by acquiring the preamble of the CPM waveform such as preamble 100 shown in FIG. 1. The preamble acquisition functions implemented by acquisition system 200 are preamble search, symbol rate detection, Doppler estimation, start-of-message (SOM) detection, which provides initial symbol timing, and initial carrier phase estimation. In addition, header detection and decoding are also a part of preamble acquisition implemented by acquisition system 200. A multiplexer 204 receives complex samples of a CPM waveform at input 202, which divides the CPM waveform input into paths 254 and 210. Path 254 is further divided into paths 226 and 242 by multiplexer 206.

Path 210 in FIG. 2 provides the operations performed during preamble, symbol rate, and Doppler detection in accordance with the present invention. In the embodiment shown, the sampling rate is 9600 Hz for 5 kHz bandwidth channels or 48000 Hz for 25 kHz bandwidth channels. Path 210 includes a samples buffer 212, a complex FFT unit 214, a power spectrum detector 216, an accumulator 218, and a spectrum analyzer 220 to provide symbol rate and Doppler information at outputs 222 and 224 respectively. Preamble, symbol rate and Doppler detection are based on analyzing the spectrum obtained by performing a 256-point complex FFT with complex FFT unit 214 and a 256-point power spectrum with power spectrum detector 216. Complex FFT unit 214 performs the complex FFTs over the most recent 256 complex samples after every few new samples are received.

Preamble detection consists of estimating a signal-to-noise ratio (SNR) from the power spectrum provided by power spectrum detector 216 and comparing the SNR to a threshold SNR. The signal power is computed as the normalized sum of the three highest tone powers, where the tone power is defined as the sum of three spectral bins around a peak. The noise power is computed as the normalized sum of all power spectral bins excluding five bins around each of five highest spectral tones. The SNR is declared valid only if the power of each of the lower and upper tones, going into the signal power estimate, is within a predetermined threshold of the center tone. This helps to assure that there are at least three tones present in order to reduce false preamble detection on two or fewer tones.

FFTs, power spectra, and SNR estimates are also performed during symbol rate detection. Accumulator 218 accumulates consecutive power spectra prior to estimating the symbol rate. During the power spectra accumulation period, if any SNR estimate drops below a "preamble lost" SNR threshold, then the acquisition system 200 returns to preamble search. After accumulator 218 has accumulated a fixed number of power spectra, an estimate of symbol rate is made. Based on the estimated symbol rate and current SNR measurements, further accumulations may be performed. Power spectra accumulation and symbol rate estimation are performed until the symbol rate estimate at output 222 does not support further accumulation.

Symbol rate detection is based upon resolving the frequency separation between the preamble sync pattern spectral tones of alternating bit pattern 112 where the center five tones are spaced one-fourth the symbol rate apart. Symbol rate detection consists of comparing the frequency separation between the 3 highest spectral tones. Tone frequency estimation involves computing the frequency associated with a given spectral bin and adjusting it based on the difference in the powers of the two neighboring spectral bins. The symbol rate most closely matching the minimum measured tone frequency spacing is selected. During symbol rate detection, the frequency of the highest three tones is estimated. The center tone of the three is the best estimate of the 0 Hz tone with Doppler. The Doppler estimate is set to the center tone frequency. Once the symbol rate has been detected, using control 208, the sampling rate is changed to 16 times the detected symbol rate, and the receive center frequency is tuned off by the measured Doppler in order to center the waveform spectrum at 0 Hz.

Path 226 in FIG. 2 implements the operations performed during the start-of-message (SOM) search. Path 226 includes a samples buffer 228, a complex correlator 230, a magnitude detector 232, a decision logic block 234, and an arctangent calculator 236 to provide symbol timing and initial carrier phase information at outputs 238 and 240 respectively. New complex samples are normalized to a magnitude of 1. After every few new complex samples, 256-point correlations are performed, in one embodiment 16 symbols times 16 samples per symbol, between the 256 most-recent normalized complex input samples and a stored normalized copy of the known SOM samples. The correlator output magnitude is computed and stored. An adjustment is made to the correlator output to perform preamble sync pattern cancellation as the sync pattern can produce large undesired correlation peaks. When the modified correlation magnitude exceeds a preset SOM threshold, then SOM detection is declared by decision logic block 234, and a control signal 256 is provided to multiplexer 206. Symbol timing information is provided at output 238. Once the SOM threshold is exceeded, an extra symbol of samples, in one embodiment 16 samples, is passed through correlator 230 to assure that the actual peak location is detected. The input sample that produces the correlation peak is the best estimate on the last, e.g., sixteenth, sample of the last SOM symbol. The initial carrier phase at the start of the SOM is provided at output 240 and is computed as:

Phase=arctan($cor\_Q/cor\_I$)

Path 242 in FIG. 2 implements the operations performed by acquisition system 200 during preamble header reception. Path 242 includes a demodulator 244, a header buffer 246, a 2-of-3 decision voter 248, and a lookup table 250 to provide header information at output 252. In the embodiment shown, the 36 coded header bits are minimum-shift keying (MSK) demodulated by demodulator 244 and stored in header buffer 246. The demodulated header bits are 2-of-3 voter decoded by 2-of-3 decision voter 248 to generate the 12 header bits of preamble 100. Lookup-table 250 used to extract and retrieve the header information from preamble 200. Header information is provided at output 252.

Figure 3:
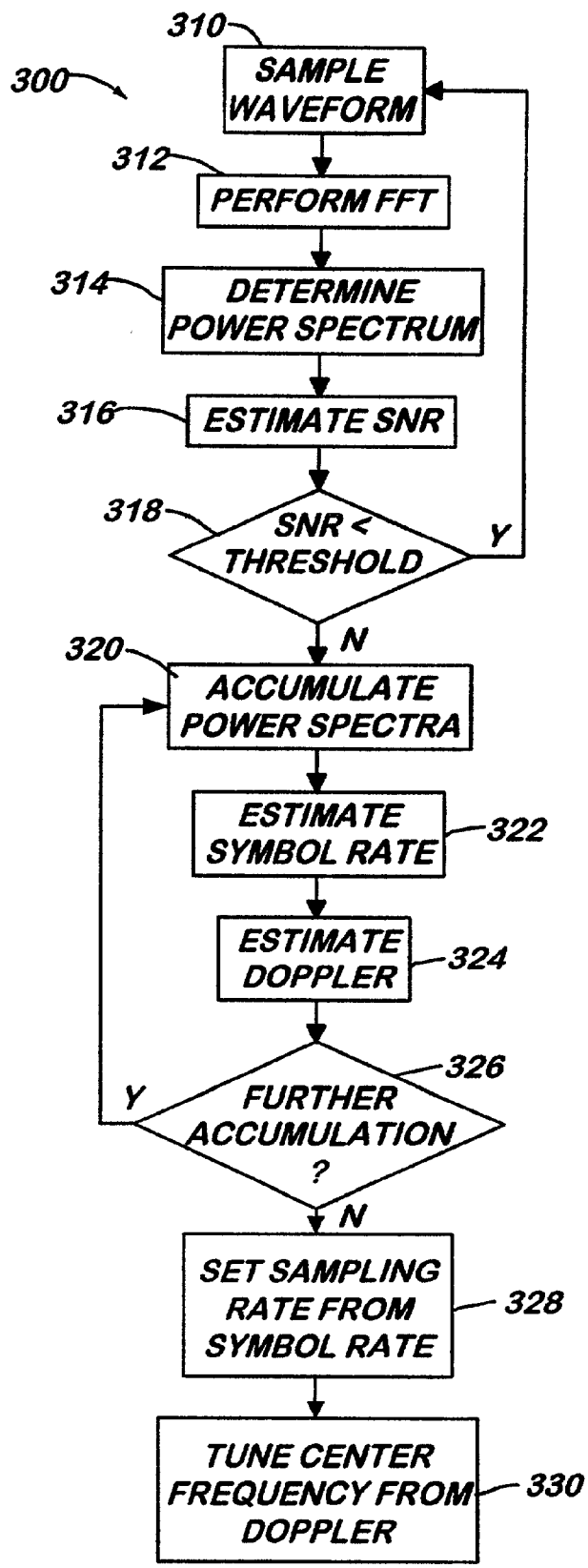
FIG. 3 is a flow diagram of a method for detecting a preamble of a CPM waveform in accordance with the present invention.

Referring now to FIG. 3, a flow diagram of a method for detecting a preamble of a CPM waveform in accordance with the present invention will be discussed. Although one order of the steps of method 300 is shown, the number or order of the steps of method 300 may be altered, including providing fewer or greater steps, or modifying any one or more of the steps, without providing any substantial change thereto. Method 300 is executed by acquisition system 200 of FIG. 2 and incorporates the functions thereof. Method 300 initiates with the sampling of a CPM waveform at step 310. A fast Fourier transform (FFT) is performed on the waveform at step 312. The power spectrum of the waveform is determined at step 314 from the FFT performed at step 312. An estimate of the signal-to-noise ratio (SNR) is executed at step 316. The SNR calculated at step 316 is compared to a threshold SNR, and a determination is made at step 318 whether the calculated SNR is less than the threshold SNR. In the event the calculated SNR is less than the threshold SNR, method 300 continues to search of a preamble by continuing execution at step 310. In the event the calculated SNR is not less than the threshold SNR, the power spectra of the waveform are accumulated at step 320. The symbol rate of the waveform is estimated at step 322, and the Doppler is estimated at step 324. A determination is made at step 326 whether further accumulation of power spectra should continue, and in the event such a determination is made, method 300 continues execution at step 320 so that estimations of the symbol rate and the Doppler are updated at steps 322 and 324, respectively. In the event no further accumulation is required, at step 328 the sampling rate is set based upon the symbol rate determined at step 322. At step 330 the center frequency is tuned based upon the Doppler determined at step 324 to center the waveform spectrum at 0 Hz.

Figure 4:
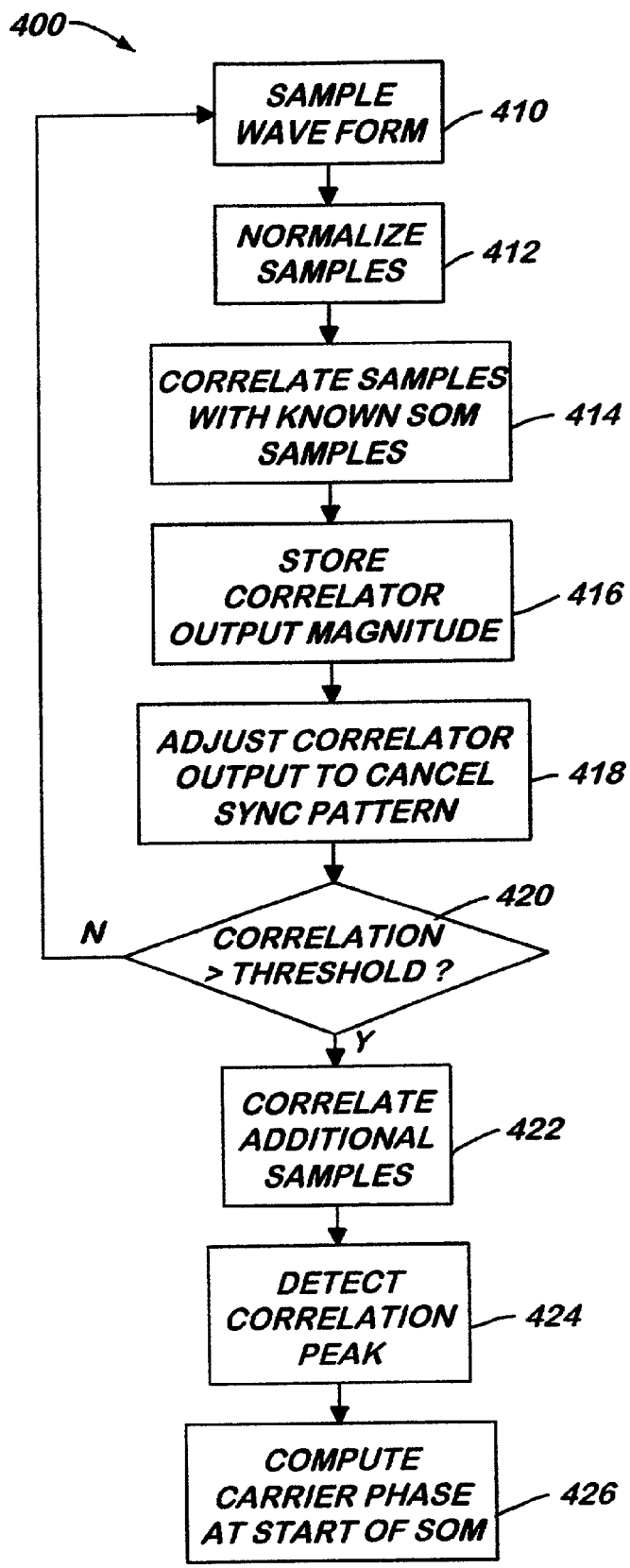
FIG. 4 is a flow diagram of a method for detecting a start-of-message (SOM) of a CPM waveform in accordance with the present invention.

Referring now to FIG. 4, a flow diagram of a method for detecting a start-of-message (SOM) of a CPM waveform in accordance with the present invention. Method 400 is executed by acquisition system 200 of FIG. 2 and incorporates the functions thereof. Although one order of the steps of method 400 is shown, the number or order of the steps of method 400 may be altered, including providing fewer or greater steps, or modifying any one or more of the steps, without providing any substantial change thereto. Method 400 initiates with the sampling of a CPM waveform at step 410. The waveform samples are normalized at step 412. The samples are correlated with known SOM samples at step 414. The magnitude of the correlator output is stored at step 416, and the output of the correlator is adjusted at step 418 to account for and to cancel or reduce the effects of the preamble alternating bit pattern 112, which in one embodiment is a sync pattern. A determination is made at step 420 whether the correlation output is greater than a threshold value, and if it is not, method 400 continues execution at step 410. When the correlation output is greater than a predetermined value, additional samples are correlated at step 422, and a correlation peak is detected at step 424. The carrier phase at the start of SOM 114 is computed at step 426.

Although the invention has been described with a certain degree of particularity, it should be recognized that elements thereof may be altered by persons skilled in the art without departing from the spirit and scope of the invention. One of the embodiments of the invention can be implemented as sets of instructions resident in a main memory of one or more digital processing systems configured to implement the invention. Until required by the digital processing system, the set of instructions may be stored in another computer readable memory such as an auxiliary memory, for example in a hard disk drive or in a removable memory such as an optical disk for utilization in a CD-ROM drive, a floppy disk for utilization in a floppy disk drive, a floppy-optical disk for utilization in a floppy-optical drive, or a personal computer memory card for utilization in a personal computer card slot. Further, the set of instructions can be stored in the memory of another digital processing system and transmitted over a local area network or a wide area network, such as the Internet, when desired by the user. Additionally, the instructions may be transmitted over a network in the form of an applet, a program executed from within another application, or a servlet, an applet executed by a server, that is interpreted or compiled after transmission to the digital processing system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the system and method for acquisition of a CPM waveform of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An apparatus for acquiring a waveform, comprising:
   means for performing a Fourier transform on a sampled waveform;
   means for providing a power spectrum of the Fourier transformed waveform;
   means for estimating a signal-to-noise ratio based upon the power spectrum of said power spectrum providing means;
   means for determining whether the signal-to-noise ratio is less than a threshold value;
   means for accumulating the power spectrum of said power spectrum providing means when said determining means determines that the signal-to-noise ratio is not less than the threshold value; and
   means for estimating a symbol rate of the waveform based upon a power spectrum accumulated by said accumulating means.

2. An apparatus as claimed in claim 1, further comprising means for setting a sampling rate for sampling the waveform based upon the symbol rate estimated by said symbol rate estimating means.

3. An apparatus as claimed in claim 1, further comprising means for estimating the Doppler shift of the waveform based upon a power spectrum accumulated by said accumulating means.

4. An apparatus as claimed in claim 1, further comprising means for estimating the Doppler shift of the waveform based upon a power spectrum accumulated by said accumulating means, and means for tuning a center frequency of the waveform based upon the Doppler shift estimated by said Doppler shift estimating means.

5. An apparatus as claimed in claim 1, further comprising means for estimating the Doppler shift of the waveform based upon a power spectrum accumulated by said accumulating means, and means for tuning a center frequency of the waveform based upon the Doppler shift estimated by said Doppler shift estimating means wherein the waveform is centered at 0 Hz.

6. An apparatus as claimed in claim 1, wherein the waveform is a continuous-phase modulation waveform.

7. An apparatus as claimed in claim 1, wherein the waveform is compliant with a MIL-STD-188-181B standard.

8. An apparatus of determining the start-of-message of a waveform, comprising:
   means for normalizing samples of a sampled waveform;
   means for correlating the normalized samples with known start-of-message samples to provide a correlation output;
   means for storing a magnitude value of the correlation output;
   means for adjusting the magnitude value of the correlation output to reduce an effect of a sync pattern of the waveform on the magnitude value of the correlation output;
   means for determining whether the adjusted magnitude value of the correlation output exceeds a threshold value; and
   means for detecting a correlation peak wherein the start-of-message of the waveform is determined.

9. An apparatus as claimed in claim 8, said correlating means correlating additional samples to assure that said correlation peak detecting means detects a proper peak.

10. An apparatus as claimed in claim 8, further comprising means for computing a carrier phase of the waveform at the start-of-message determined by said correlation peak detecting means.

11. An apparatus as claimed in claim 8, wherein the waveform is a continuous-phase modulation waveform.

12. An apparatus as claimed in claim 8, wherein the waveform is compliant with a MIL-STD-188-181B standard.

13. An apparatus for acquiring a waveform, comprising:
means for searching for a preamble of the waveform;
means for detecting the symbol rate of the waveform;
means for estimating the Doppler shift of the waveform;
means for detecting the start-of-message of the waveform; and
means for estimating an initial carrier phase of the waveform.

14. An apparatus as claimed in claim 13, further comprising means for detecting the header of the waveform, and means for decoding the header of the waveform.

15. An apparatus as claimed in claim 13, said means for searching for a preamble including a sample buffer structure, a fast Fourier transform processor structure, a power spectrum detector structure, an accumulator structure, and a spectrum analyzer structure.

16. An apparatus as claimed in claim 13, said means for detecting the symbol rate including a sample buffer structure, a fast Fourier transform processor structure, a power spectrum detector structure, an accumulator structure, and a spectrum analyzer structure.

17. An apparatus as claimed in claim 13, said means for estimating the Doppler shift including a sample buffer structure, a fast Fourier transform processor structure, a power spectrum detector structure, an accumulator structure, and a spectrum analyzer structure.

18. An apparatus as claimed in claim 13, said means for estimating the start-of-message including a sample buffer structure, a correlator structure, and a decision logic structure.

19. An apparatus as claimed in claim 13, said means for estimating an initial carrier phase including a sample buffer structure, a correlator structure, a decision logic structure, and an arctangent calculator structure.

20. An apparatus as claimed in claim 13, wherein the waveform is a continuous-phase modulation waveform.

* * * * *